UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

YELLOW AZO DYESTUFF FOR WOOL.

971,762.     Specification of Letters Patent.     Patented Oct. 4, 1910.

No Drawing.     Application filed May 5, 1910. Serial No. 559,541.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse No. 5, have invented new and useful Improvements in Yellow Azo Dyestuffs for Wool, of which the following is a specification.

My invention relates to the production of yellow azo dyestuffs for wool and consists in combining the tetrazo compounds of diamins corresponding to the formula:

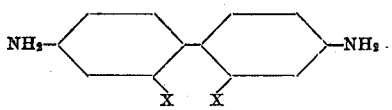

wherein X may be $CH_3$ or Cl, with one molecular proportion of an ortho-oxy-carboxylic acid of the benzene series and one molecular proportion of 1-sulfoaryl-3-methyl-5-pyrazolone. The thus obtained dyestuffs dye wool from acid bath yellow shades fast without after-treatment with chromates to white wool and cotton in the milling process. Diamins of the aforesaid constitution are meta-tolidin and dichlorobenzidin.

The manufacture of the coloring matter is illustrated by the following examples; parts being by weight.

Example I: 10.6 parts of meta-tolidin are tetrazotized and combined with an ice cold soda alkaline solution of 7.2 parts of salicylic acid. After the formation of the intermediate product a solution of 13 parts of 1-para-sulfophenyl-3-methyl-5-pyrazolone, neutralized with soda, is added and the mixture stirred till the formation of dyestuff is complete. The temperature is raised to 70° and the dyestuff precipitated by addition of common salt. It is a yellow-brown powder dissolving in concentrated sulfuric acid with orange, in water with yellow color. The aqueous solution turns slightly red by addition of caustic soda lye; by addition of hydrochloric acid the dyestuff is precipitated from such a solution in shape of red flakes. It dyes wool yellow shades fast to milling.

Example II: 12.65 parts of meta-dichlorobenzidin are tetrazotized and combined with an ice cold soda alkaline solution of 7.2 parts of salicylic acid. After formation of the intermediate product a solution of 13 parts 1-para-sulfophenyl-3-methyl-5-pyrazolone, neutralized with soda, is added and the mixture stirred until the formation of dyestuff is complete. The temperature is then raised to 70° and the dyestuff precipitated by addition of common salt. It forms a yellow-brown powder and dissolves in concentrated sulfuric acid with orange, in water with yellow color. The aqueous solution turns red by addition of caustic soda lye; an addition of hydrochloric acid precipitates the dyestuff from such a solution in form of red flakes. It dyes wool yellow shades fast against milling.

In analogous manner may be performed the production of dyestuff if instead of salicylic acid are used ortho- or meta-cresotinic acid or other sulfoarylmethylpyrazolones, phenyl-3-methyl-5-pyrazolone or chlorin substitution products thereof, for instance 1-meta-sulfophenyl-3-methyl-5-pyrazolone, 1-para-sulfo-orthotolyl-3-methyl-5-pyrazolone, 1-ortho-chloro-para-sulfophenyl-3-methyl-5-pyrazolone, 1-ortho-chloro-meta-sulfophenyl-3-methyl-5-pyrazolone, 1-para-chloro-meta-sulfophenyl-3-methyl-5-pyrazolone, 1-4-sulfo-2:5-dichlorophenyl-3-methyl-5-pyrazolone.

All the thus obtained dyestuffs substantially show the same properties, they dye wool yellow shades fast to white cotton and wool in the milling process.

Now what I claim and desire to secure by Letters Patent is the following:

1. The process for the manufacture of yellow azo dyestuffs for wool consisting in combining the tetrazo compounds of diamins corresponding to the general formula:

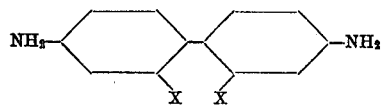

wherein X means $CH_3$, or Cl, with one molecular proportion of an ortho-oxy-carboxylic acid of the benzene series and one molecular proportion of 1-sulfoaryl-3-methyl-5-pyrazolone.

2. As new articles the azo dyestuffs obtained by combining the tetrazotized diamins of the general formula:

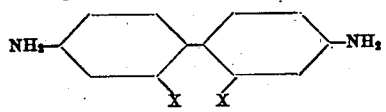

wherein X means CH₃, or Cl, with one molecular proportion of an ortho-oxy-carboxylic acid of the benzene series and one molecular proportion of 1-sulfoaryl-3-methyl-5-pyrazolone the said dyestuffs being yellow brown powders, dissolving in concentrated sulfuric acid with orange, in water with yellow color, the aqueous solution of which is turned slightly red by addition of caustic soda lye, while by addition of hydrochloric acid the dyestuff is precipitated in shape of yellow flakes; dyeing wool yellow shades fast against milling.

3. The process for the manufacture of yellow azo dyestuffs for wool consisting in combining the tetrazo compound of meta-meta' dichlorobenzidin with one molecule of an ortho-oxy-carboxylic acid of the benzene series and one molecule of 1-sulfoaryl-3-methyl-5-pyrazolone.

4. As new articles the azo dyestuffs obtained by combining the tetrazo compound of meta-meta'-dichlorobenzidin with one molecule of an ortho-oxy-carboxylic acid of the benzene series and one molecule of 1-sulfoaryl-3-methyl-5-pyrazolone, the said dyestuffs being yellow brown powders, dissolving in concentrated sulfuric acid with orange, in water with yellow color, the aqueous solution of which is turned slightly red by addition of caustic soda lye, while the dyestuff is precipitated in shape of yellow flakes by addition of hydrochloric acid to such a solution; dyeing wool yellow shades fast to milling.

In testimony, that I claim the foregoing as my invention, I have signed my name in presence of two witnesses, this 22nd day of April 1910.

AUGUST LEOPOLD LASKA.

Witnesses:
 Eva Sattler,
 Vikar Standhardt.